(12) United States Patent
Yuan et al.

(10) Patent No.: US 9,179,325 B2
(45) Date of Patent: Nov. 3, 2015

(54) TRANSMISSION METHOD AND SYSTEM FOR RELAY PHYSICAL DOWNLINK CONTROL CHANNEL

(75) Inventors: Ming Yuan, Shenzhen (CN); Feng Bi, Shenzhen (CN); Feng Liang, Shenzhen (CN); Jin Yang, Shenzhen (CN); Shuanshuan Wu, Shenzhen (CN); Bo Dai, Shenzhen (CN); Shuqiang Xia, Shenzhen (CN); Yifei Yuan, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 13/634,856
(22) PCT Filed: Mar. 23, 2011
(86) PCT No.: PCT/CN2011/072074
§ 371 (c)(1),
(2), (4) Date: Sep. 13, 2012
(87) PCT Pub. No.: WO2011/137696
PCT Pub. Date: Nov. 10, 2011

(65) Prior Publication Data
US 2013/0201899 A1   Aug. 8, 2013

(30) Foreign Application Priority Data
May 5, 2010   (CN) .......................... 2010 1 0173436

(51) Int. Cl.
*H04W 16/26*   (2009.01)
*H04W 84/04*   (2009.01)
(Continued)

(52) U.S. Cl.
CPC ............. *H04W 16/26* (2013.01); *H04L 5/0051* (2013.01); *H04L 5/0053* (2013.01); *H04L 5/0094* (2013.01); *H04W 72/042* (2013.01); *H04W 72/0453* (2013.01); *H04W 84/047* (2013.01)

(58) Field of Classification Search
None
See application file for complete search history.

(56) References Cited

U.S. PATENT DOCUMENTS

| 2011/0268064 A1* | 11/2011 | Chen et al. .................... 370/329 |
| 2012/0099518 A1* | 4/2012 | Park et al. ..................... 370/315 |
| 2012/0120924 A1* | 5/2012 | Montojo et al. .............. 370/336 |

(Continued)

FOREIGN PATENT DOCUMENTS

| CN | 101516104 A | 8/2009 |
| CN | 101868033 A | 10/2010 |

(Continued)

*Primary Examiner* — Chirag Shah
*Assistant Examiner* — Suk Jin Kang
(74) *Attorney, Agent, or Firm* — Koppel, Patrick, Heybl & Philpott

(57) ABSTRACT

The present invention discloses a transmission method and system for a Relay Physical Downlink Control Channel (R-PDCCH). The method comprises the steps of: an eNB bearing downlink grant information of a relay node onto an available Orthogonal Frequency Division Multiplex (OFDM) symbol of a first slot of a pre-allocated Physical Resource Block (PRB) pair used for bearing the R-PDCCH, wherein available OFDM symbols in the PRB pair, other than the OFDM symbol used for the downlink grant information, are used for bearing a Physical Downlink Shared Channel (PDSCH) of each relay node; the eNB transmitting the PRB pair bearing the downlink grant information and the PDSCH to the relay node. The present invention is well applicable to a link between an eNB and a relay node, and meanwhile enables backhaul resources to be used adequately.

5 Claims, 14 Drawing Sheets

(51) Int. Cl.
*H04L 5/00* (2006.01)
*H04W 72/04* (2009.01)

(56) References Cited

U.S. PATENT DOCUMENTS

| | | | |
|---|---|---|---|
| 2012/0163288 A1* | 6/2012 | Kim et al. | 370/315 |
| 2012/0163335 A1* | 6/2012 | Chung et al. | 370/330 |
| 2012/0178360 A1* | 7/2012 | Park et al. | 455/7 |
| 2012/0213147 A1* | 8/2012 | Noh et al. | 370/315 |
| 2012/0218964 A1* | 8/2012 | Park et al. | 370/329 |
| 2012/0230290 A1* | 9/2012 | Seo et al. | 370/329 |
| 2013/0010682 A1* | 1/2013 | Kim et al. | 370/315 |
| 2013/0010684 A1* | 1/2013 | Park et al. | 370/315 |
| 2013/0034070 A1* | 2/2013 | Seo et al. | 370/329 |
| 2013/0044712 A1* | 2/2013 | Kim et al. | 370/329 |
| 2013/0051310 A1* | 2/2013 | Kim et al. | 370/315 |
| 2013/0064172 A1* | 3/2013 | Park et al. | 370/315 |

FOREIGN PATENT DOCUMENTS

| | | |
|---|---|---|
| CN | 101516104 B | 1/2011 |
| KR | 200910128323 A | 12/2009 |
| KR | 20100032813 A | 3/2010 |
| WO | WO2010032973 A2 | 3/2010 |
| WO | WO2010032973 A3 | 6/2010 |

* cited by examiner

TRANSMISSION METHOD AND SYSTEM FOR RELAY PHYSICAL DOWNLINK CONTROL CHANNEL

FIELD OF THE INVENTION

The present invention relates to the field of communications, in particular to a transmission method and a transmission system for a Relay Physical Downlink Control Channel (R-PDCCH).

BACKGROUND OF THE INVENTION

A Long-Term Evolution (LTE) system, an LTE-Advance (LTE-A) system and an International Mobile Telecommunication Advanced (IMT-A) system are all based on Orthogonal Frequency Division Multiplexing (OFDM). In an OFDM system, data are in a form of two dimensions, i.e., time domain and frequency domain. In the OFDM system, one subframe consists of two slots. If adopting a normal Cyclic Prefix (CP), each slot consists of seven OFDM symbols; and if adopting an extended CP, each slot consists of six OFDM symbols. A Physical Downlink Control Channel (PDCCH) is located on the former one or two or three or four OFDM symbols. In an LTE communication system, the information transmitted by the PDCCH consists of Downlink grant (DL grant) information and Uplink grant (UL grant) information.

At present, in the LTE system, a mapping process of the PDCCH is that: at a transmission end, an Enhanced NodeB (eNB) first encodes the PDCCH (comprising DL grant and UL grant) of each piece of User Equipment (UE) belonging to the eNB independently, that is, the PDCCH of each UE can adopt a different code rate; then the eNB concentrates all encoded PDCCHs in series and scrambles them using a cell-specific sequence to obtain a series of Control Channel Elements (CCEs); later the eNB performs Quadrature Phase Shift Keying (QPSK) modulation on the series of CCEs above, and then interleaves the symbols above with a Resource Element Group (REG) as a unit and finally maps the symbols to the former one or two or three or four OFDM symbols in a manner of first time domain and then frequency domain. At a receiving end, the UE demodulates the PDCCH using Cell-Specific Reference Signals (CRSs) and performs blind detection on the CCE to finally obtain respective PDCCH.

FIG. 1 shows an architecture diagram of a mobile communication system introducing a relay node. In the mobile communication system, a link between an eNB and a Relay Node (RN) is called a relay link (backhaul Link or Un link); a link between the RN and a user in the coverage of the RN is called an access link (or Uu link); and a link between the eNB and a UE in the coverage of the eNB is called a direct link. For the eNB, an RN equals a UE; for the UE, the RN equals an eNB.

So called inband relay means that the backhaul link and the access link use the same frequency band. Therefore, when inband relay is adopted, in order to avoid the transmission-receiving interference of the RN itself, the RN can not perform transmission and receiving simultaneously on the same frequency resource. When the RN transmits a physical downlink control channel to a UE belonging to the RN, the RN can not receive a physical downlink control channel from the eNB. Therefore, on a downlink backhaul subframe (that is, the subframe on which the eNB transmits data to the RN), the RN first transmits a PDCCH to the UE belonging to the RN on the former one or two OFDM symbols, and then performs handover from transmission to receiving in a time period, after handover is completed, the RN receives data from the eNB on the latter OFDM symbols, the data comprising an R-PDCCH and a Physical Downlink Shared Channel (PDSCH) of the relay, as shown in FIG. 2.

The R-PDCCH transmitted from the eNB to the RN is borne on a Physical Resource Block (PRB), the R-PDCCH comprising information such as uplink/downlink scheduling grant of the RN. On a downlink backhaul subframe, as shown in FIG. 3, the eNB semi-statically reserves a number of PRBs for transmission of the R-PDCCH. The inventor finds that in relevant art there is no reasonable mapping solution when bearing the R-PDCCH using the PRBs, thus resource conflict or overflow might be caused and backhaul resources can not be effectively utilized.

SUMMARY OF THE INVENTION

The present invention provides a transmission method and a transmission system for an R-PDCCH which at least solves the problem above.

According to one aspect of the present invention, a transmission method for an R-PDCCH is provided, comprising the steps of: an eNB bearing downlink grant information of a relay node onto an available OFDM symbol of a first slot of a pre-allocated Physical Resource Block (PRB) pair used for bearing the R-PDCCH, wherein available OFDM symbols in the PRB pair, other than the OFDM symbol used for the downlink grant information, are used for bearing a PDSCH of each relay node; and the eNB transmitting the PRB pair bearing the downlink grant information and the R-PDSCH to the relay node.

Preferably, after the step of the eNB transmitting the PRB pair to the relay node, the method further comprises a step of: the relay node demodulating the R-PDCCH using a Demodulation Reference Signal (DMRS) to obtain the downlink grant information and the PDSCH of the relay node.

Preferably, for each relay node, which only has the downlink grant information, under the eNB, the eNB bears the downlink grant information and the PDSCH of each relay node onto the PRB pair according to one of the following modes: applying a non-precoded DMRS to the first slot of the PRB pair, after the eNB completely or partially interleaves the downlink grant information of each relay node, the eNB bearing the completely or partially interleaved downlink grant information onto the available OFDM symbol of the first slot of the PRB pair, wherein the available OFDM symbols in the PRB pair, other than the OFDM symbol used for the downlink grant information, are used for bearing the PDSCH of each relay node; applying a non-precoded DMRS to the first slot of the PRB pair, the eNB bearing the downlink grant information of respective relay nodes onto available OFDM symbols of the first slots of different PRB pairs respectively, wherein the available OFDM symbols in the PRB pair, other than the OFDM symbol used for the downlink grant information, are used for bearing the PDSCH of each relay node; applying a precoded DMRS, the eNB bearing the downlink grant information of respective relay nodes onto available OFDM symbols of the first slots of different PRB pairs respectively, wherein the available OFDM symbols in the PRB pair, other than the OFDM symbol used for the downlink grant information, are used for bearing the PDSCH of the relay node corresponding to the first slot of the PRB pair.

Preferably, after the step of the eNB transmitting the PRB pair to the relay node, the method further comprises a step of: the relay node demodulating the R-PDCCH using a Cell-Specific Reference Signal (CRS) to obtain the downlink grant information and the PDSCH of the relay node.

Preferably, for each relay node, which only has the downlink grant information, under the eNB, the eNB bears the downlink grant information and the PDSCH of each relay node onto the PRB pair according to one of the following modes:

after the eNB completely or partially interleaves the downlink grant information of each relay node, the eNB bearing the completely or partially interleaved downlink grant information onto the available OFDM symbol of the first slot of the PRB pair, wherein all the available OFDM symbols in the PRB pair, other than the OFDM symbol used for the downlink grant information, are used for bearing the PDSCH of each relay node; the eNB bearing the downlink grant information of each relay node onto the available OFDM symbol of the first slot of the PRB pair, wherein a second slot of the PRB pair is used for bearing the PDSCH of each relay node.

According to another aspect of the present invention, a transmission system for an R-PDCCH is provided, comprising: an eNB, configured to bear downlink grant information of a relay node onto an available OFDM symbol of a first slot of a pre-allocated PRB pair used for bearing the R-PDCCH, wherein available OFDM symbols in the PRB pair, other than the OFDM symbol used for the downlink grant information, are used for bearing a PDSCH of each relay node; the relay node, configured to demodulate out the downlink grant information and the PDSCH of the relay node from the PRB pair.

Preferably, the relay node is configured to demodulate the R-PDCCH using a DMRS to demodulate out the downlink grant information and the PDSCH of the relay node from the PRB pair.

Preferably, the relay node is configured to demodulate the R-PDCCH using a CRS to demodulate out the downlink grant information and the PDSCH of the relay node from the PRB pair.

By virtue of the present invention, through bearing a PDSCH and downlink grant information of an R-PDCCH onto available OFDM symbols of a pre-allocated PRB pair used for bearing the R-PDCCH, the mapping problem of the R-PDCCH is solved. The present invention is well applicable to a link between an eNB and a relay node, and meanwhile enables backhaul resources to be used adequately.

BRIEF DESCRIPTION OF THE DRAWINGS

Drawings, provided for further understanding of the present invention and forming a part of the specification, are used to explain the present invention together with embodiments of the present invention rather than to limit the present invention, wherein:

FIG. 6' shows another flowchart of a transmission method for an R-PDCCH according to Embodiment 1 of the present invention;

DETAILED DESCRIPTION OF THE EMBODIMENTS

The present invention is described below in detail by reference to the accompanying drawings in conjunction with embodiments. It should be noted that the embodiments in the application and the characteristics in the embodiments can be combined if no conflict is caused.

Before the technical solution provided by the embodiments of the present invention is described, to facilitate description, definitions and regulations are provided for several terms below referred in the embodiments of the present invention.

1. Resource Element (abbreviated as RE): it is a smallest time-frequency resource block and one RE occupies one sub-carrier of one OFDM symbol.

2. Resource Element Group (abbreviated as REG): one REG can consist of 4 or 6 REs depending on the location of a reference symbol on each OFDM symbol.

3. Control Channel Element (abbreviated as CCE): one CCE consists of 36 REs, i.e., 9 REGs, and information contained in the CCE comprises: a DL grant and an UL grant of a user.

4. Physical Resource Block (abbreviated as PRB): one PRB is one continuous slot in a time domain and 12 continuous subcarriers in a frequency domain.

5. PRB pair: one PRB pair is one continuous subframe in the time domain and 12 continuous subcarriers in the frequency domain.

6. Internal interleaving: it refers to the self-interleaving of a DL grant (or an UL grant) of an RN and takes REG or CCE as an interleaving unit.

7. Complete interleaving (or total interleaving): it refers that an eNB concentrates DL grants (or UL grants) of all RNs in series and performs interleaving with REG as a unit (REG-level) or CCE as a unit (CCE-level).

8. Partial interleaving: it refers that an eNB groups RNs, only concentrates GL grants (or UL grants) of the RNs in the same group in series and performs interleaving with REG as a unit (REG-level) or CCE as a unit (CCE-level).

Embodiment 1

Figure 1:
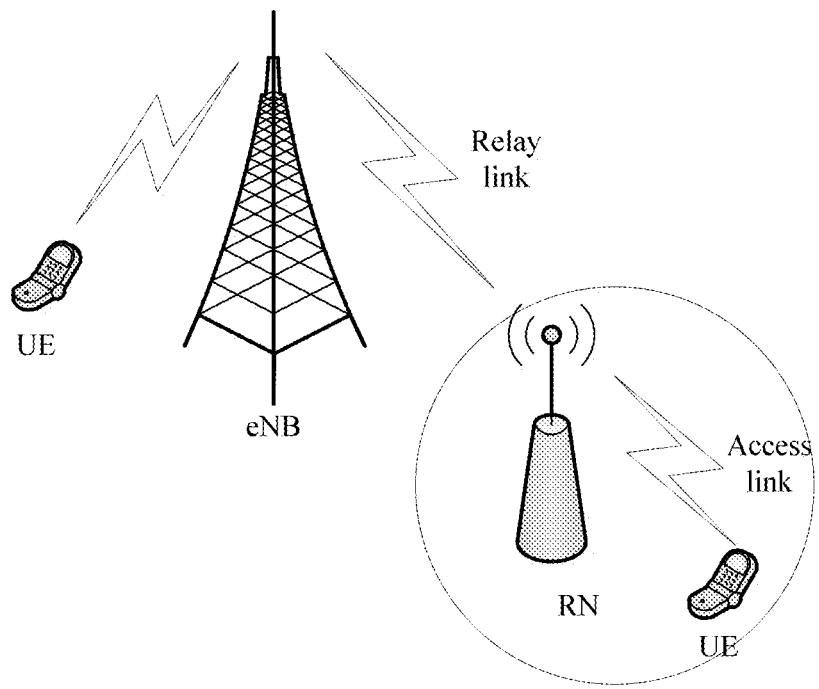
FIG. 1 shows an architecture diagram of a system containing an RN according to relevant art.
Figure 2:
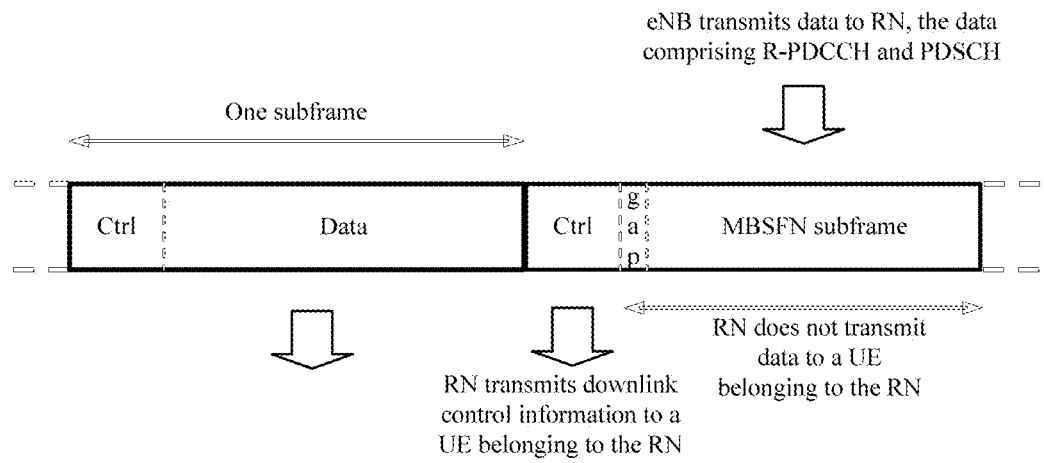
FIG. 2 shows a structure diagram of a frame according to relevant art.
Figure 3:
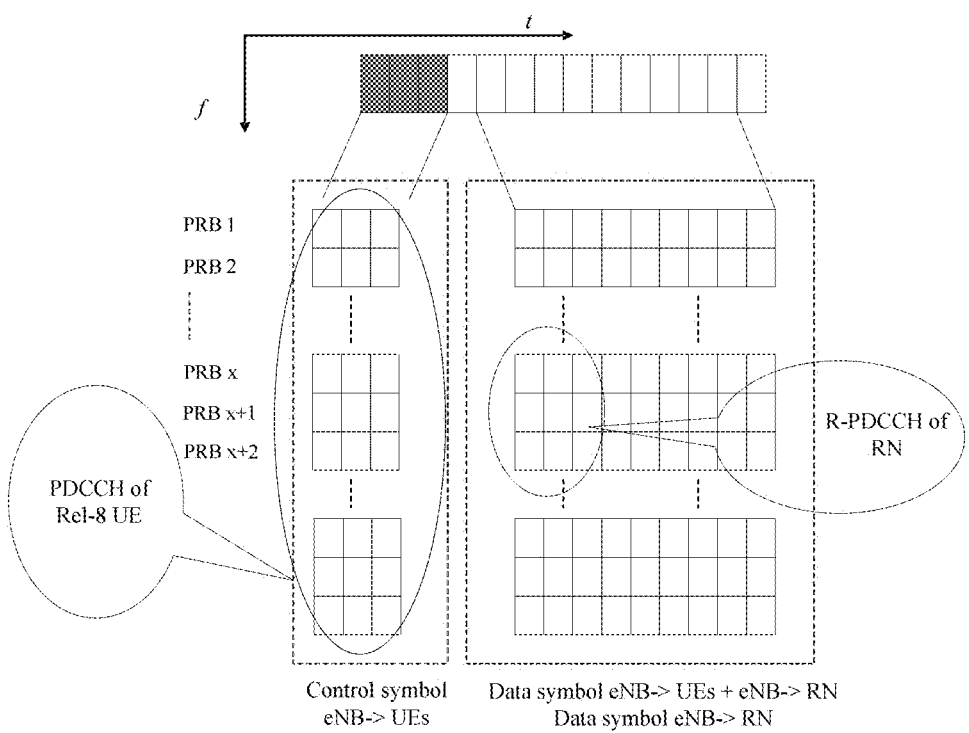
FIG. 3 shows a diagram of a location relationship between an R-PDCCH and a PDCCH according to relevant art.
Figure 4:
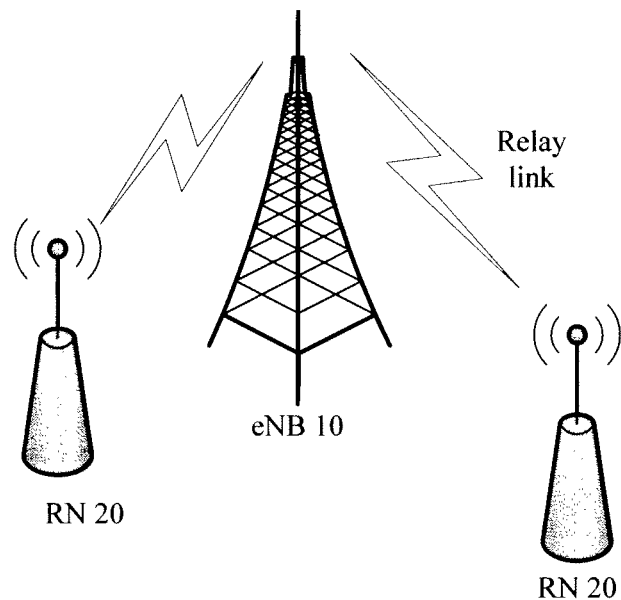
FIG. 4 shows a structure diagram of a transmission system for an R-PDCCH according to Embodiment 1 of the present invention.

FIG. 4 shows a structure diagram of a transmission system for an R-PDCCH according to Embodiment 1 of the present invention. The transmission system comprises an eNB 10 and a relay node 20. The eNB 10 is configured to bear downlink grant information of the relay node 20 onto an available OFDM symbol of a first slot of a pre-allocated PRB pair used for bearing an R-PDCCH, and/or bear uplink grant information of the relay node 20 onto an available OFDM symbol of the first slot or all slots of the PRB pair; and transmit the PRB pair bearing the downlink grant information and/or the uplink grant information to the relay node 20. The relay node 20 is configured to demodulate out the downlink grant information and/or the uplink grant information of the relay node from the PRB pair.

For example, the eNB 10 can semi-statically pre-allocate one or more PRB pairs used for bearing the R-PDCCH for each relay node 20 belonging to the eNB 10 and then bear the downlink grant information and/or the uplink grant information of each relay node 20 onto the first slot or all slots of the one or more PRB pairs. The downlink grant information of each relay node 20 is mapped to available OFDM symbol of the first slot of the one or more PRB pairs, so as to reduce the time delay of the relay node 20 demodulating the R-PDCCH.

For example, the relay node 20 can demodulate the R-PDCCH using a DMRS, to obtain the downlink grant information and/or the uplink grant information of the relay node; or, the relay node 20 can demodulate the R-PDCCH using a CRS. For different demodulation modes of the relay node 20, the eNB 10 can map the R-PDCCH of the relay node 20 based on different modes, wherein the specific mapping modes are described in the embodiments below.

Since there is no reasonable mapping solution when bearing the R-PDCCH using a reserved PRB pair in relevant art, resource conflict or overflow might be caused. However, in the above system of the embodiment, the eNB bears the downlink grant information of the relay node 20 onto the available OFDM symbol of the first slot of the PRB pair used for bearing the R-PDCCH, and/or bears the uplink grant information of the relay node 20 onto the available OFDM symbol of the first slot or all slots of the PRB pair, thereby reasonably utilizing a downlink backhaul subframe, thus backhaul resources are reasonably utilized.

Figure 5:
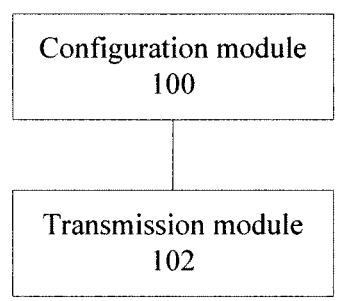
FIG. 5 shows a structure diagram of an eNB according to Embodiment 1 of the present invention.

FIG. 5 shows a structure diagram of an eNB 10 according to Embodiment 1 of the present invention. The eNB 10 comprises: a configuration module 100 which is configured to bear the downlink grant information of the relay node 20 onto the available OFDM symbol of the first slot of the pre-allocated PRB pair used for bearing the R-PDCCH, and/or is configured to bear the uplink grant information of the relay node 20 onto the available OFDM symbol of the first slot or all slots of the PRB pair; and a transmission module 102 which is configured to transmit the PRB pair bearing the downlink grant information and/or the uplink grant information to the relay node 20.

With the eNB 10 in Embodiment 1 of the present invention, the downlink grant information in the R-PDCCH of the relay node 20 can be mapped to the available OFDM symbol of the first slot of the PRB pair used for bearing the R-PDCCH, and the uplink grant information can be mapped to the available OFDM symbol of the first slot (or the first slot and the second slot) of the PRB pair, thus backhaul resources can be reasonably utilized.

Figure 6:
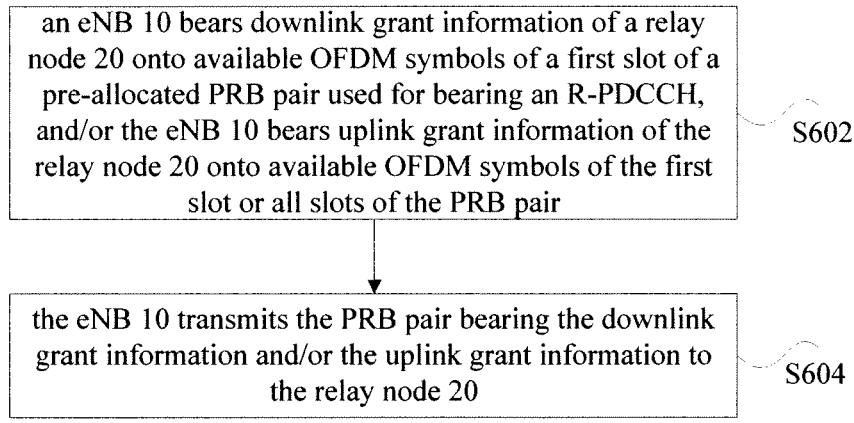
FIG. 6 shows a flowchart of a transmission method for an R-PDCCH according to Embodiment 1 of the present invention.
Figure 6:
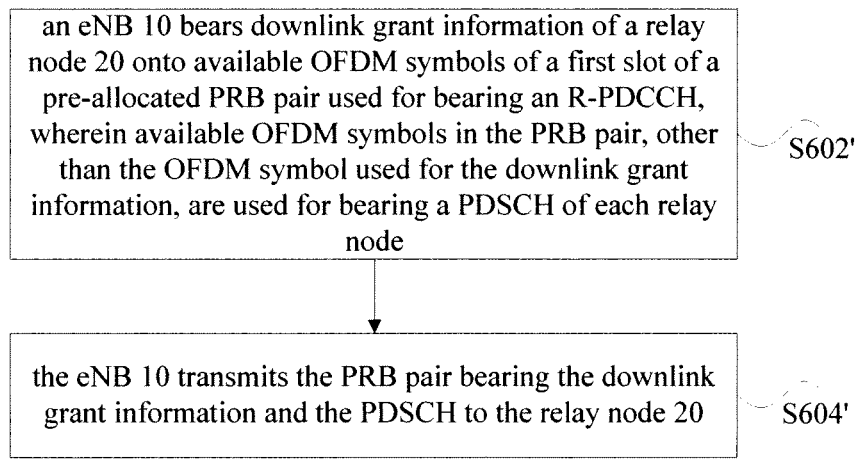

FIG. 6 shows a flowchart of a transmission method for an R-PDCCH according to Embodiment 1 of the present invention. The method comprises the following steps (S602 to S604).

S602: an eNB 10 bears downlink grant information of a relay node 20 onto an available OFDM symbol of a first slot of a pre-allocated PRB pair used for bearing an R-PDCCH, and/or the eNB 10 bears uplink grant information of the relay node 20 onto an available OFDM symbol of the first slot or all slots of the PRB pair.

For example, in the condition of DMRS based demodulation, the eNB can only map the DL grant (DL grant information) to part or all OFDM symbols of the first slot of the PRB pair used for bearing the R-PDCCH; if the relay node 20 has both the DL grant and the UL grant, the UL grant is mapped to the second slot of the PRB pair, otherwise, the UL grant preferentially is mapped to all of the OFDM symbols of the first slot of the PRB pair used for bearing the R-PDCCH, and secondly is mapped to all of the OFDM symbols of the PRB pair used for bearing the R-PDCCH.

In the condition of CRS based demodulation, the eNB 10 might not distinguish the DL grant and the UL grant, and completely interleaves the R-PDCCH of all relay nodes 20 together and then maps to the first slot of the PRB pair, or the eNB 10 interleaves the DL grant of all relay nodes 20 together and maps to the first slot of the PRB pair, and interleaves the UL grant of all relay nodes 20 together and maps to the second slot of the PRB pair.

S604: the eNB 10 transmits the PRB pair bearing the downlink grant information and/or the uplink grant information to the relay node 20.

For example, after the eNB 10 transmits the PRB pair to the relay node 20, the relay node 20 can demodulate the R-PDCCH using a DMRS or CRS to obtain the downlink grant information and/or the uplink grant information of the relay node.

FIG. 6' shows another flowchart of a transmission method for an R-PDCCH according to Embodiment 1 of the present invention. The method comprises the following steps.

S602': an eNB 10 bears downlink grant information of a relay node 20 onto an available OFDM symbol of a first slot of a pre-allocated PRB pair used for bearing an R-PDCCH, wherein available OFDM symbols in the PRB pair, other than the OFDM symbol used for the downlink grant information, are used for bearing a PDSCH of each relay node.

S604': the eNB 10 transmits the PRB pair bearing the downlink grant information and the PDSCH to the relay node 20.

Preferably, after the eNB 10 transmits the PRB pair to the relay node 20, the relay node 20 can demodulate the R-PDCCH using a DMRS or CRS to obtain the downlink grant information and the PDSCH of the relay node.

Since there is no reasonable mapping solution when bearing the R-PDCCH using a reserved PRB pair in relevant art, problems of resource conflict or overflow might be caused. However, in the above method of the embodiment, the eNB 10 bears the downlink grant information of the relay node 20 onto the available OFDM symbol of the first slot of the PRB pair used for bearing the R-PDCCH, and/or bears the uplink grant information of the relay node 20 onto available the OFDM symbol of the first slot or all slots of the PRB pair, thereby reasonably utilizing a downlink backhaul subframe, thus backhaul resources are reasonably utilized.

Embodiment 2

In this embodiment, the RN 20 demodulates the R-PDCCH based on a DMRS, wherein the R-PDCCH of each RN 20 contains both DL grant and UL grant; the DL grant and the UL grant are mapped to the same one or more PRB pairs used for bearing the R-PDCCH.

Figure 7:
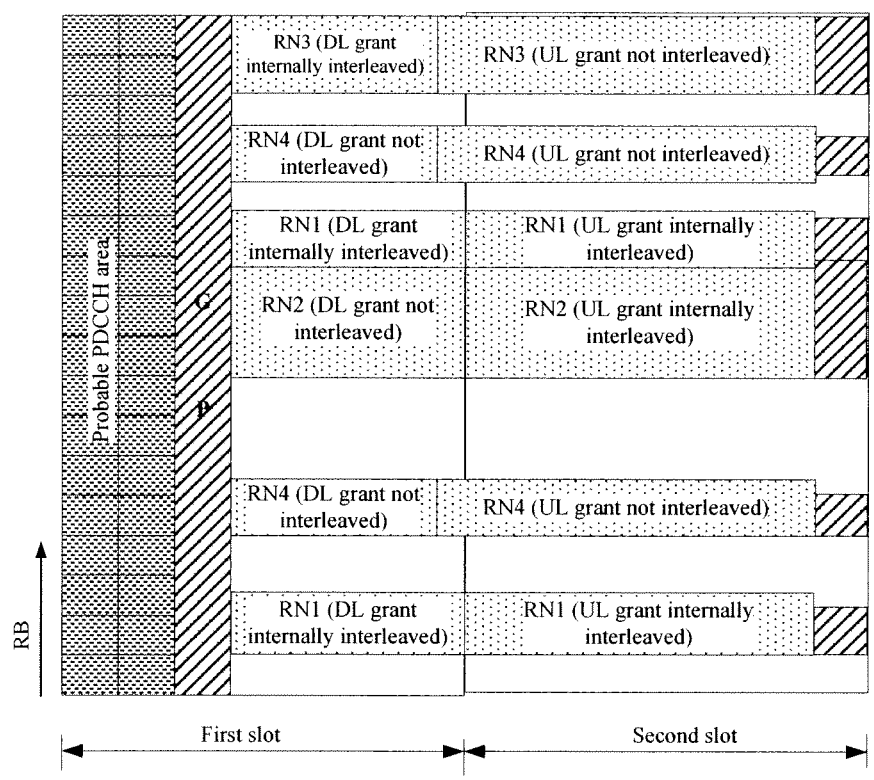
FIG. 7 shows a mapping diagram of an R-PDCCH according to Embodiment 2 of the present invention.

At the eNB 10 end:

the eNB 10 semi-statically pre-allocates one or more PRB pairs used for bearing the R-PDCCH for each RN 20 belonging to the eNB 10, that is, the PRB pair can only be used for a unique RN, as shown in FIG. 7.

In this embodiment, the eNB 10 can bear the R-PDCCH of the RN on the PRB pair allocated for the RN to transmit to the RN through the following modes.

Mode 1: the eNB 20 allocates two discrete PRB pairs for an RN1 semi-statically, maps the DL grant of the RN1 onto part or all available OFDM symbols of the first slots (FIG. 7 corresponds to all available OFDM symbols of the first slots) of the two PRB pairs above after internally interleaving the DL grant of the RN1, and maps the UL grant of the RN1 onto all available OFDM symbols in the two PRB pairs above other than the OFDM symbols used for the DL grant (the available OFDM symbols for the UL grant of the RN1 are all available OFDM symbols of the second slots in FIG. 7) after internally interleaving the UL grant of the RN1.

Mode 2: the eNB 20 allocates three continuous PRB pairs for an RN2 semi-statically, maps the DL grant of the RN2 onto part or all available OFDM symbols of the first slots (FIG. 7 corresponds to all available OFDM symbols of the first slots) of the three PRB pairs above without internally interleaving the DL grant of the RN2, and maps the UL grant of the RN2 onto all available OFDM symbols in the three PRB pairs above other than the OFDM symbols used for the DL grant (the available OFDM symbols for the UL grant of the RN2 are all available OFDM symbols of the second slots in FIG. 7) after internally interleaving the UL grant of the RN2.

Mode 3: the eNB 20 allocates two continuous PRB pairs for an RN3 semi-statically, maps the DL grant of the RN3 onto part or all available OFDM symbols of the first slots (FIG. 7 corresponds to part available OFDM symbols of the first slots) of the two PRB pairs above after internally interleaving the DL grant of the RN3, and maps the UL grant of the RN3 onto all available OFDM symbols in the two PRB pairs above other than the OFDM symbols used for the DL grant (the available OFDM symbols for the UL grant of the RN3 are the rest OFDM symbols of the first slots and all available OFDM symbols of the second slots in FIG. 7) without internally interleaving the UL grant of the RN3.

Mode 4: the eNB 20 allocates two discrete PRB pairs for an RN4 semi-statically, maps the DL grant of the RN4 onto part or all available OFDM symbols of the first slots (FIG. 7 corresponds to part available OFDM symbols of the first slots) of the two PRB pairs above without internally interleaving the DL grant of the RN4, and maps the LTL grant of the RN4 onto all available OFDM symbols in the two PRB pairs above other than the OFDM symbols used for the DL grant (the available OFDM symbols for the UL grant of the RN4 are the rest OFDM symbols of the first slots and all available OFDM symbols of the second slots in FIG. 7) without internally interleaving the UL grant of the RN4.

At the RN 20 end:

if the eNB 10 end notifies in advance each RN 20 of a specific PRB pair, which is used for bearing the R-PDCCH, allocated for each RN 20, the RN directly performs demodulation (de-interleaving) on part or all available OFDM symbols of the first slot of the pre-allocated PRB pair to obtain the DL grant, and then performs demodulation (de-interleaving) on all available OFDM symbols other than the OFDM symbols used for the DL grant to obtain the UL grant. Whether to perform de-interleaving depends on whether the eNB end performs internal interleaving.

If the eNB does not notify in advance each RN of a specific PRB pair, which is used for bearing the R-PDCCH, allocated for the RN, the RN needs to perform a blind detection on the PRB pair to first find the PRB pair belonging to the RN itself and then demodulates out the corresponding DL grant and UL grant according to the steps above.

Embodiment 3

In this embodiment, the RN 20 performs demodulation based on a DMRS; and each RN belonging to the eNB 10 has the DL grant alone, with no UL grant.

Figure 8:
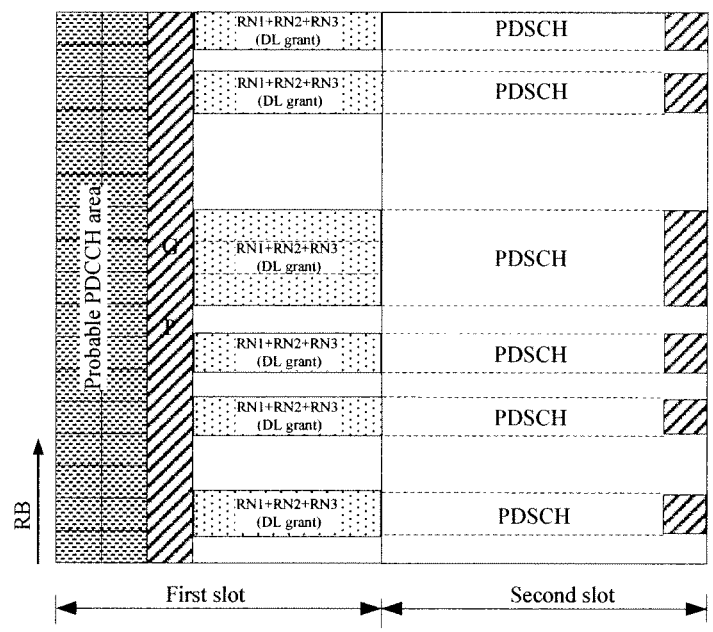
FIG. 8 shows a mapping diagram of an R-PDCCH according to Embodiment 3 of the present invention.

The eNB 10 reserves a group of one or more PRB pairs used for bearing the R-PDCCH semi-statically; as shown in FIG. 8, the eNB 10 reserves eight PRB pairs used for bearing the R-PDCCH. The eNB 10 can map the R-PDCCH of each RN according to one of the following modes.

Mode 1

At the eNB 10 end:

the eNB 10 applies a non-precoded DMRS to the first slots of the group of PRB pairs above, maps the DL grant of an RN1, an RN2 and an RN3 onto part or all available OFDM symbols of the first slots (FIG. 8 corresponds to part available OFDM symbols of the first slots) of the group of PRB pairs after performing a complete interleaving on the DL grant of the RN1, the RN2 and the RN3, wherein all available OFDM symbols in the group of PRB pairs above other than the OFDM symbols used for the DL grant are used for bearing the R-PDSCH of the RN1, the RN2 and the RN3 (the available OFDM symbols for the R-PDSCH of the RN1, the RN2 and the RN3 are all available OFDM symbols of the second slots in FIG. 8).

Figure 9:
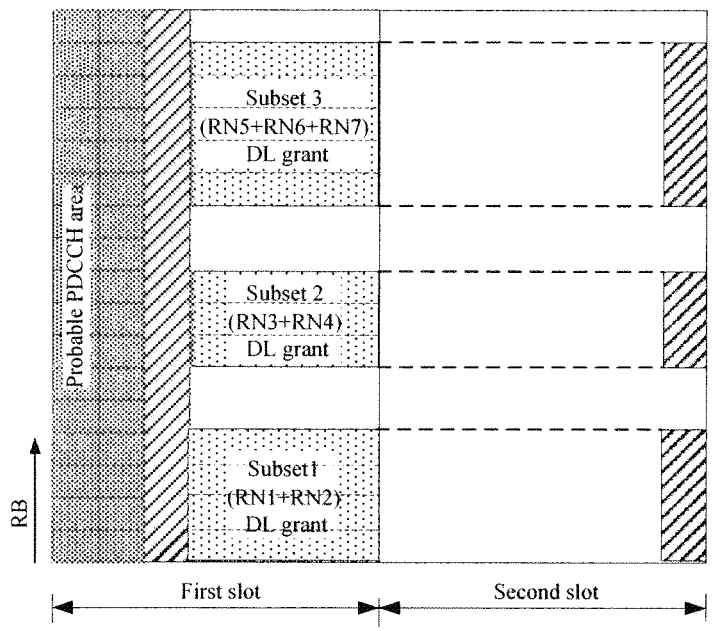
FIG. 9 shows another mapping diagram of an R-PDCCH according to Embodiment 3 of the present invention.

In addition, the DL grant of all RNs also can be partially interleaved and mapped onto part or all available OFDM symbols of the first slots of the group of PRB pairs above. As shown in FIG. 9, interleaving is performed between the DL grant of the RN1 and the DL grant of the RN2, between the DL grant of the RN3 and the DL grant of the RN4, and among the DL grant of an RN5, the DL grant of an RN6 and the DL grant of an RN7; then the DL grant is mapped onto part or all available OFDM symbols of the first slots of different PRB pairs used for bearing the R-PDCCH.

At the RN 20 end:

the RN 20 receives part or all available OFDM symbols of the first slots of the group of PRB pairs above, performs demodulation and de-interleaving, and finally blindly detects out its own DL grant, and receives the R-PDSCH on a corresponding time-frequency resource of the second slot according to an indication of the DL grant.

Mode 2

At the eNB 10 end:

the eNB applies a non-precoded DMRS to the first slots of the group of PRB pairs above, respectively maps the DL grant of different RNs onto part or all available OFDM symbols of the first slots of different PRB pairs in the group of PRB pairs without performing interleaving between the DL grant of different RNs, wherein all available OFDM symbols in the PRB pair other than the OFDM symbols used for the DL grant are used for bearing the R-PDSCH of an RN the same as or different from the RN of the first slot.

Figure 10:
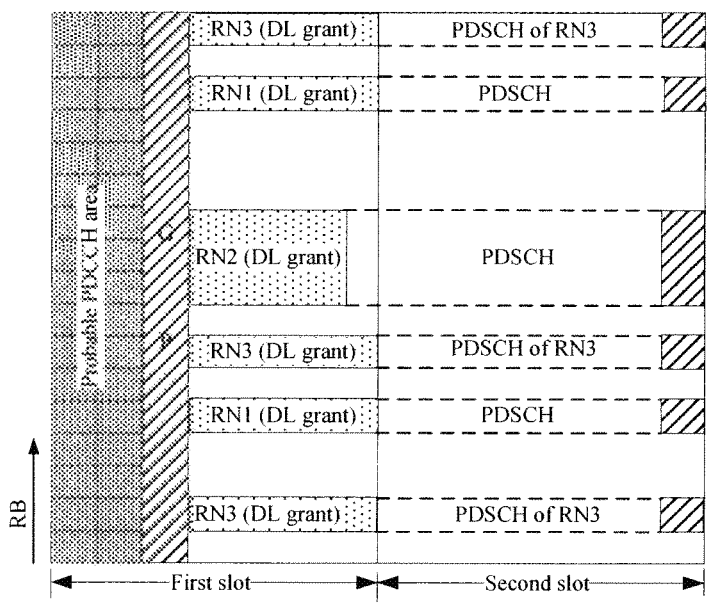
FIG. 10 shows a third mapping diagram of an R-PDCCH according to Embodiment 3 of the present invention.

As shown in FIG. 10, the DL grant of the RN1, the DL grant of the RN2 and the DL grant of the RN3 are not interleaved and are respectively mapped onto part or all available OFDM symbols of the first slots of respective dedicated PRB pairs reserved. Specifically, the DL grant of the RN1 and the DL grant of the RN2 are mapped onto all available OFDM symbols of the first slots; and the DL grant of the RN3 is mapped onto part available OFDM symbols of the first slots. All available OFDM symbols in the PRB pairs on which the RN1 and the RN2 are located, other than the OFDM symbols used for the DL grant, are used for bearing the R-PDSCH of an RN different from the RN of the first slot; all available OFDM symbols in the PRB pairs on which the RN3 is located, other than the OFDM symbols used for the DL grant, are used for bearing an R-PDSCH of the RN3 itself.

At the RN end:

if the eNB notifies in advance each RN of a specific PRB pair, which is used for bearing the R-PDCCH, allocated for each RN, the RN directly obtains the DL grant from part or all available OFDM symbols of the first slot of the pre-allocated PRB pair, receives the R-PDSCH on all available OFDM symbols of the second slot, other than the OFDM symbols used for the DL grant, according to an indication of the DL grant.

If the eNB does not notify in advance each RN of a specific PRB pair, which is used for bearing the R-PDCCH, allocated for the RN, the RN needs to perform a blind detection on the first slot of the PRB pair to find the PRB pair belonging to the RN itself and then demodulates out the corresponding DL grant according to the steps above.

Mode 3:

At the eNB 10 end:

the eNB applies a precoded DMRS, and maps the DL grant of different RNs onto part or all available OFDM symbols of the first slots of different PRB pairs used for bearing the R-PDCCH without performing interleaving between the DL grant of different RNs, wherein all available OFDM symbols in the PRB pair other than the OFDM symbols used for the DL grant are used for bearing the R-PDSCH of the same RN of the first slot.

Figure 11:
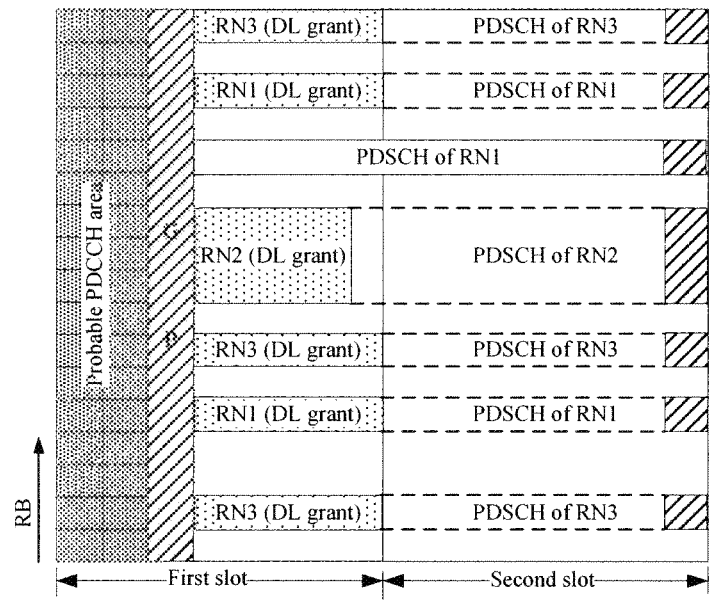
FIG. 11 shows a fourth mapping diagram of an R-PDCCH according to Embodiment 3 of the present invention.

As shown in FIG. 11, an RN1, an RN2 and an RN3 have respective one or more dedicated PRB pairs, wherein the DL grant of the RN1, the DL grant of the RN2 and the DL grant of the RN3 are all located on part or all available OFDM symbols of the first slots of respective PRB pairs, while the rest OFDM symbols can not bear the R-PDSCH of another RN and can only bear the R-PDSCH of the RN itself.

At the RN end:

if the eNB notifies in advance each RN of what specific PRB pairs used for bearing the R-PDCCH are allocated for the RN, the RN directly obtains the DL grant from part or all available OFDM symbols of the first slots of the pre-allocated PRB pairs and then obtains the R-PDSCH from a corresponding time-frequency resource according to an indication of the DL grant, wherein all the rest available OFDM symbols in the PRB pairs, other than the OFDM symbols used for the DL grant, can only be used for bearing the R-PDSCH of the RN corresponding to the DL grant.

If the eNB does not notify in advance each RN of what specific PRB pairs used for bearing the R-PDCCH are allocated for the RN, the RN needs to perform a blind detection on the first slots of the PRB pairs to find the PRB pairs belonging to the RN itself and then demodulates out the corresponding DL grant according to the steps above.

Embodiment 4

In this embodiment, the RN 20 demodulates the R-PDCCH based on a DMRS, and each RN belonging to the eNB 10 has UL grant alone, with no DL grant. Similar to Embodiment 3, the eNB 10 reserves a group of one or more PRB pairs (eight PRB pairs) used for bearing the R-PDCCH semi-statically.

In this embodiment, the eNB 10 can bear the R-PDCCH of the RN onto a PRB pair allocated for the RN to transmit to the RN according to the following modes.

Mode 1

At the eNB 10 end:

the eNB applies a non-precoded DMRS to the first slot, maps the UL grant of all RNs onto all available OFDM symbols of the first slots of the PRB pairs used for bearing the R-PDCCH after completely interleaving the UL grant of all RNs, wherein all available OFDM symbols on the second slots of the PRB pairs are used for bearing downlink services of other RNs. This mapping mode is similar to Mode 1 of "DL grant alone"; during complete interleaving, the DL grant in FIG. 8 in Embodiment 3 is changed to be UL grant; during partial interleaving, the DL grant in FIG. 9 in Embodiment 3 is changed to be UL grant.

At the RN end:

The RN receives all available OFDM symbols of the first slots of the group of PRB pairs above, performs demodulation and de-interleaving, and finally blindly detects out its own UL grant.

Mode 2

At the eNB 10 end:

the eNB respectively maps the UL grant of different RNs onto all available OFDM symbols of the first slots of different PRB pairs without performing interleaving between the DL grant of different RNs, wherein all available OFDM symbols of the second slot of each PRB pair are used for bearing downlink services of other RNs. This mapping mode is similar to Mode 2 in Embodiment 3, the difference lies in that: the "DL grant alone" can occupy part available OFDM symbols of the first slot, while the "UL grant alone" occupies all available OFDM symbols of the first slot. In this mode, the DL grant in FIG. 10 in Embodiment 3 is changed to be UL grant and the UL grant occupies the whole first slot.

At the RN end:

if the eNB notifies in advance each RN of a specific PRB pair, which is used for bearing the R-PDCCH, allocated for each RN 20, the RN directly obtains the UL grant from all available OFDM symbols of the first slot of the pre-allocated PRB pair.

If the eNB does not notify in advance each RN of a specific PRB pair, which is used for bearing the R-PDCCH, allocated for the RN 20, the RN needs to perform a blind detection on the first slots of the PRB pairs to find the PRB pair belonging to the RN itself and then demodulates out the corresponding UL grant according to the steps above.

Mode 3

The eNB 10 applies a non-precoded DMRS to both the first slot and the second slot, and maps the UL grant of all RNs onto all available OFDM symbols of the PRB pair used for bearing the R-PDCCH after completely interleaving the UL grant.

Figure 12:
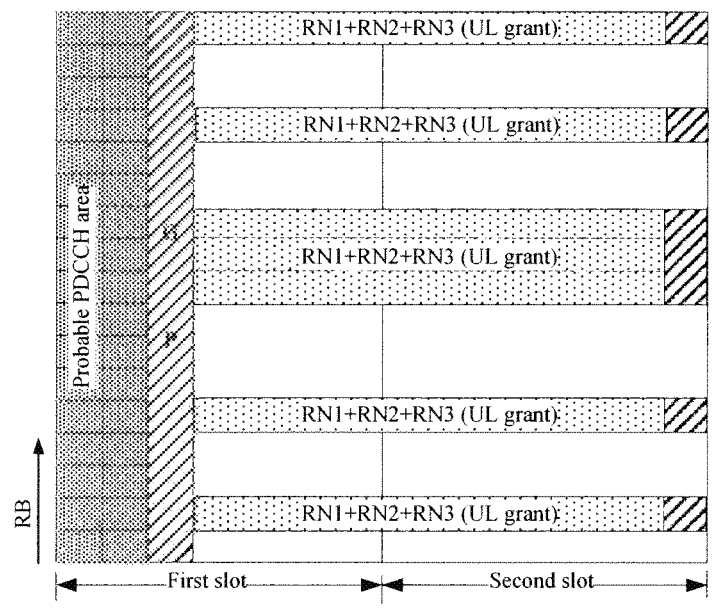
FIG. 12 shows a mapping diagram of an R-PDCCH according to Embodiment 4 of the present invention.

As shown in FIG. 12, the UL grant of an RN1, the UL grant of an RN2 and the UL grant of an RN3 are mapped to all available OFDM symbols of a pre-allocated group of PRB pairs after being completely interleaved.

Figure 13:
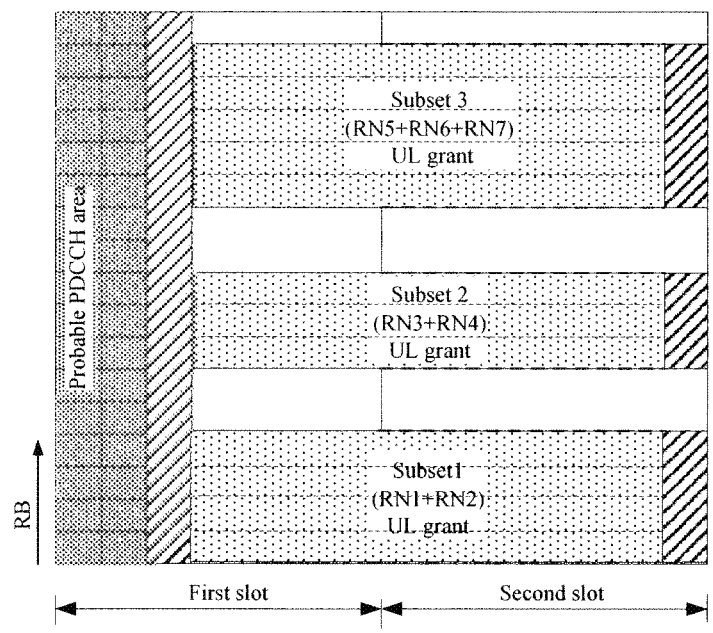
FIG. 13 shows another mapping diagram of an R-PDCCH according to Embodiment 4 of the present invention.

During partial interleaving, as shown in FIG. 13, interleaving is performed between the UL grant of the RN1 and the UL grant of the RN2, between the UL grant of the RN3 and the UL grant of an RN4, and among the UL grant of an RN5, the UL grant of an RN6 and the UL grant of an RN7; then the UL grant is mapped onto all available OFDM symbols of different PRB pairs used for bearing the R-PDCCH.

Mode 4

The eNB 10 applies a precoded DMRS and maps the UL grant of different RNs onto all available OFDM symbols of different PRB pairs without performing interleaving between the UL grant of different RNs.

Figure 14:
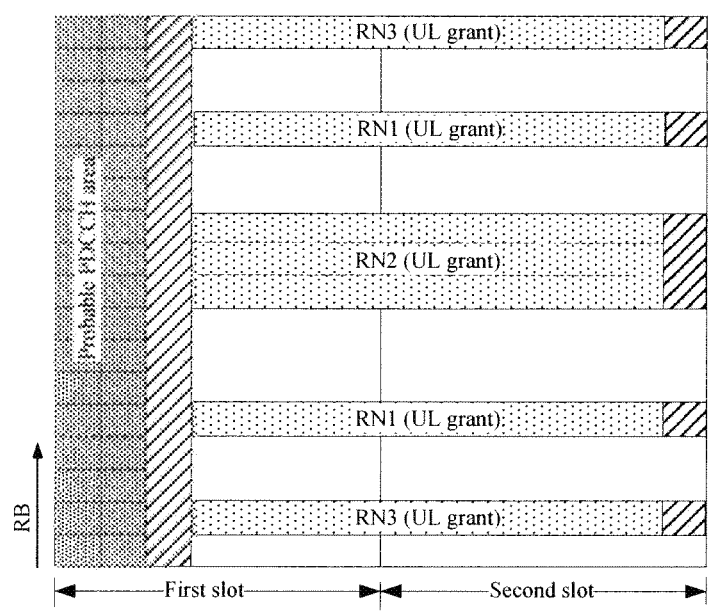
FIG. 14 shows a third mapping diagram of an R-PDCCH according to Embodiment 4 of the present invention.

As shown in FIG. 14, the UL grant of the RN1, the UL grant of the RN2 and the UL grant of the RN3 are not interleaved and respectively occupy all available OFDM symbols of different PRB pairs.

Embodiment 5

In this embodiment, the RN 20 demodulates the R-PDCCH based on a DMRS; and in this embodiment, some RNs 20 under the eNB 10 have DL grant only, while other RNs 20 have UL grant only. Similar to Embodiment 3, in this embodiment, the eNB 10 reserves a group of one or more PRB pairs (eight PRB pairs) used for bearing the R-PDCCH semi-statically.

In this embodiment, the eNB 10 can bear the R-PDCCH of the RN onto the PRB pair allocated for the RN to transmit to the RN according to the following modes.

Mode 1

The eNB 10 applies a non-precoded DMRS to the first slot, maps all DL grant and UL grant onto all available OFDM symbols of the first slots of the PRB pairs used for bearing the R-PDCCH after partially or completely interleaving the DL grant and the UL grant, wherein all available OFDM symbols of the second slots of the PRB pairs used for bearing the R-PDCCH are used for bearing downlink services of the RN.

Figure 15:
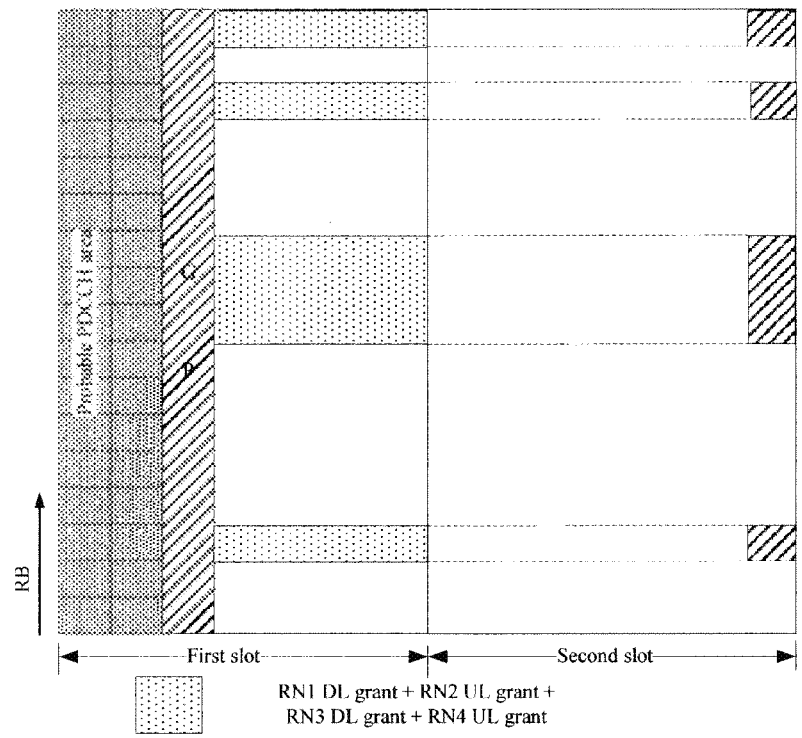
FIG. 15 shows a mapping diagram of an R-PDCCH according to Embodiment 5 of the present invention.

As shown in FIG. 15, the DL grant of an RN1 and the DL grant of an RN3, and the UL grant of an RN2 and the UL grant of an RN4 are completely interleaved together, and then are mapped onto all available OFDM symbols of the first slots of the group of PRB pairs reserved.

Each RN only needs to demodulate and de-interleave the first slots of the PRB pairs above, and obtains respective R-PDCCH after performing a blind detection.

Figure 16:
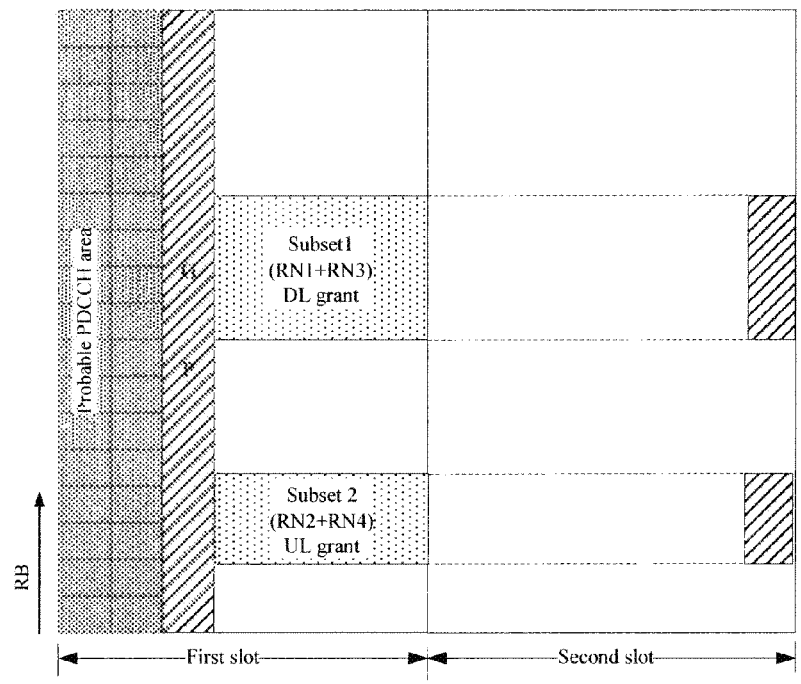
FIG. 16 shows another mapping diagram of an R-PDCCH according to Embodiment 5 of the present invention.

During partial interleaving, as shown in FIG. 16, the DL grant of the RN1 and the DL grant of the RN3 are interleaved together, the UL grant of the RN2 and the UL grant of the RN4 are interleaved together, and then are mapped onto all available OFDM symbols of the first slots of different PRB pairs used for bearing the R-PDCCH.

Mode 2

The eNB 10 applies a precoded DMRS, and maps the DL grant and the UL grant onto different PRB pairs respectively without performing interleaving between the DL grant and the UL grant, wherein the DL grant is mapped onto part or all available OFDM symbols of the first slots of the PRB pairs used for bearing the R-PDCCH, and the rest OFDM symbols bear the R-PDSCH corresponding to the DL grant; the UL grant is mapped onto all OFDM symbols of the first slots of the PRB pairs or all available OFDM symbols of the PRB pairs.

Figure 17:
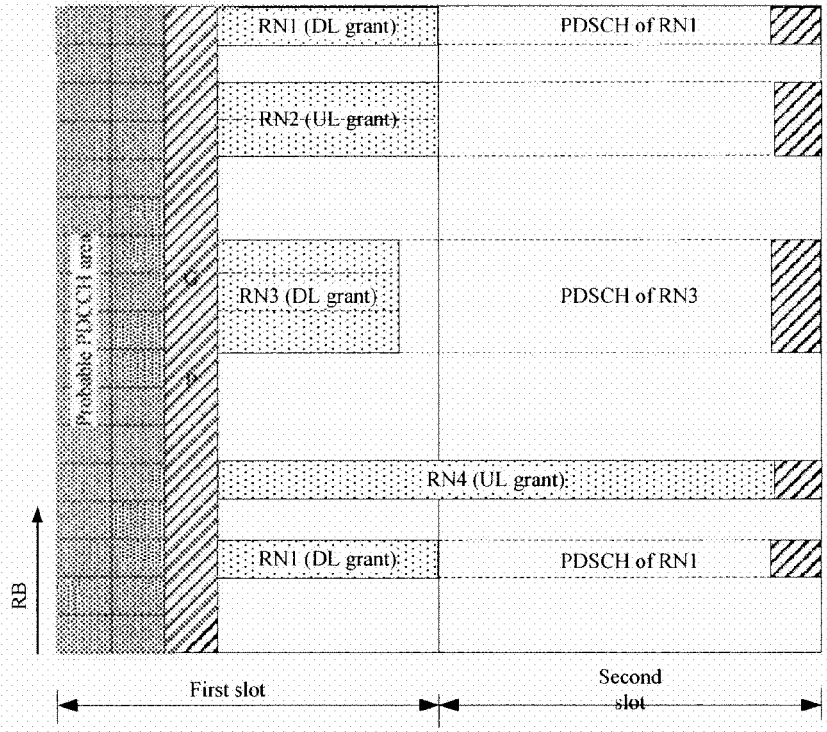
FIG. 17 shows a third mapping diagram of an R-PDCCH according to Embodiment 5 of the present invention.

As shown in FIG. 17, each RN has its own dedicated PRB pair. The DL grant of the RN1 is located on the first slots of two pre-allocated discrete PRB pairs, while the second slots only bear the R-PDSCH of the RN1 itself. The DL grant of the RN3 is located on part available OFDM symbols of the first slots of three pre-allocated continuous PRB pairs, while the rest available OFDM symbols of the three PRB pairs can only bear the R-PDSCH of the RN3 itself. The UL grant of the RN2 is located on all available OFDM symbols of the first slots of two pre-allocated continuous PRB pairs, while the rest resource is used for bearing other downlink services. The UL grant of the RN4 is located on part available OFDM symbols of the first slot of one pre-allocated PRB pair, while the rest resource is used for bearing the R-PDSCH of the RN4.

Embodiment 6

In this embodiment, the RN 20 demodulates the R-PDCCH based on a CRS. The R-PDCCH of the RN 20 in the charge of the eNB 10 contains both DL grant and UL grant, and the DL grant and the UL grant of each RN 20 can be mapped in one or more same or different PRB pairs.

Mode 1

The DL grant and the UL grant of the same RN 20 are mapped in one or more same PRB pairs, wherein the specific mapping method is the same as each mode in Embodiment 2.

Mode 2

Figure 18:
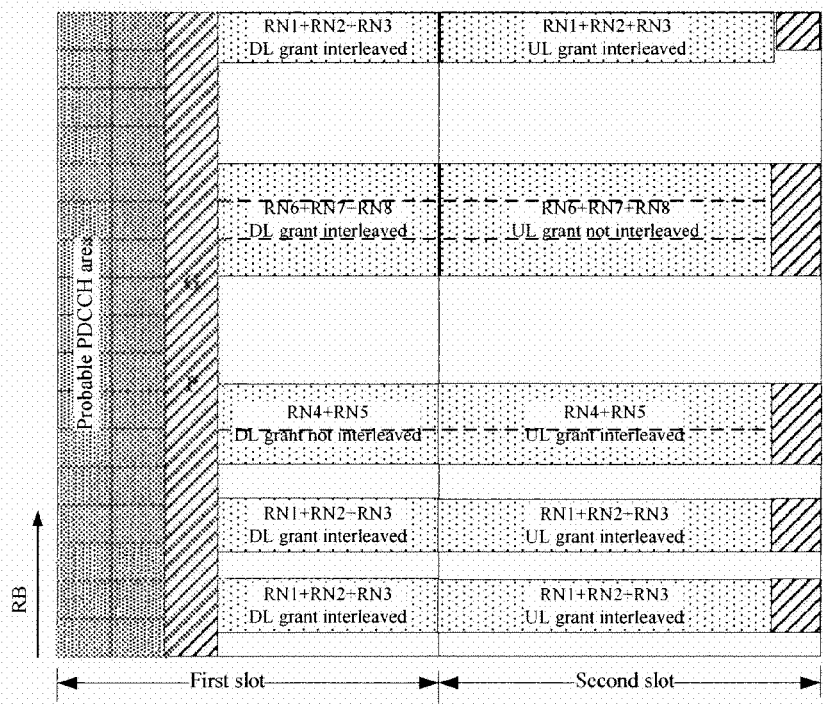
FIG. 18 shows a mapping diagram of an R-PDCCH according to Embodiment 6 of the present invention.
Figure 19:
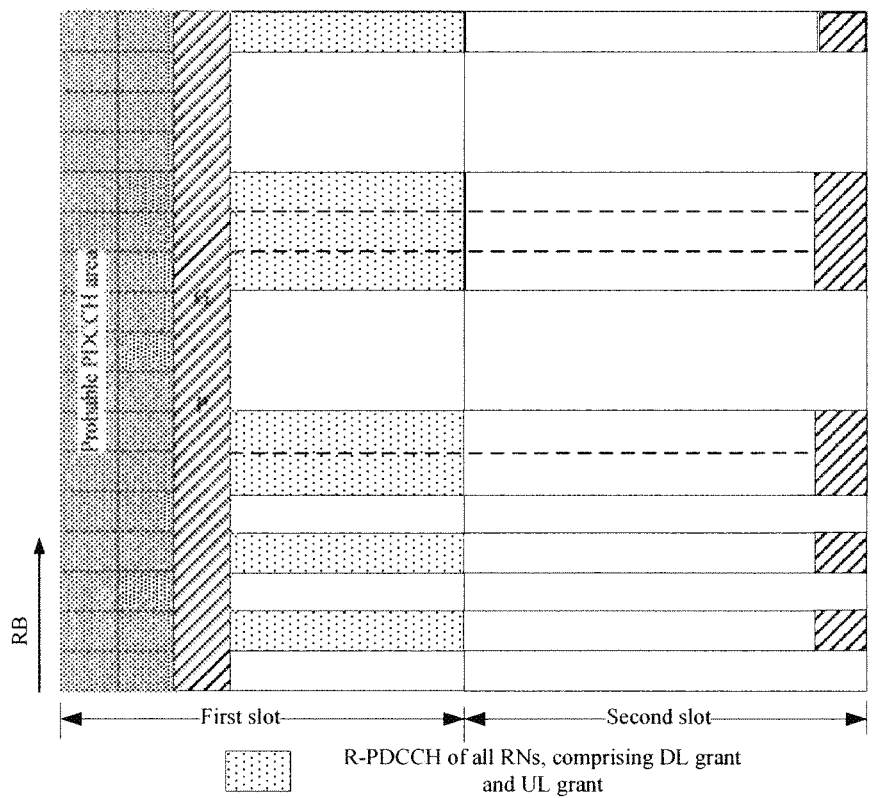
FIG. 19 shows another mapping diagram of an R-PDCCH according to Embodiment 6 of the present invention.

The DL grant and the UL grant of the same RN 20 are mapped in one or more PRB pairs; the eNB 10 reserves a group of one or more PRB pairs used for bearing the R-PDCCH semi-statically, then the R-PDCCH can be transmitted by the following modes:

a) the eNB maps the DL grant of all RNs 20 onto part or all available OFDM symbols of the first slots of the PRB pairs used for bearing the R-PDCCH after completely or partially interleaving the DL grant, and maps all UL grant onto all available OFDM symbols in the PRB pairs used for bearing the R-PDCCH, other than the OFDM symbols used for bearing the DL grant, after completely or partially interleaving the UL grant. As shown in FIG. 18, the DL grant of an RN1, the DL grant of an RN2 and the DL grant of an RN3 are completely interleaved and then mapped onto all available OFDM symbols of the first slots; the UL grant of the RN1, the UL grant of the RN2 and the UL grant of the RN3 are completely interleaved and then mapped onto all available OFDM symbols of the second slots.

b) interleaving is not performed between the DL grant of different RNs and the DL grant of different RNs is mapped onto all available OFDM symbols of the first slots of the PRB pairs used for bearing the R-PDCCH; the UL grant of all RNs 20 is completely or partially interleaved and is mapped onto all available OFDM symbols of the second slot of the PRB pairs above, as shown in the cases of an RN4 and an RN5 in FIG. 18.

c) all DL grant is completely or partially interleaved and then is mapped onto part or all available OFDM symbols of the first slots of the PRB pairs used for bearing the R-PDCCH; interleaving is not performed between the UL grant of different RNs and the UL grant of different RNs is mapped onto all available OFDM symbols in the PRB pair, other than the OFDM symbols used for the DL grant, as shown in the cases of an RN6, an RN7 and an RN8 in FIG. 18.

d) the eNB does not distinguish the DL grant and the UL grant, completely interleaves the R-PDCCH of all RNs 20 together and maps them onto all available OFDM symbols of the first slots of the group of PRB pairs, as shown in FIG. 19.

Embodiment 7

In this embodiment, the RN 20 demodulates an R-PDCCH based on a CRS. Each RN under the eNB 10 has DL grant alone, with no UL grant. Similar to Embodiment 3, the eNB 10 semi-statically reserves a group of one or more PRB pairs (eight PRB pairs) used for bearing the R-PDCCH.

In this embodiment, the transmission of the R-PDCCH comprises the following modes.

Mode 1

The eNB 10 maps the DL grant of all RNs 20 onto part or all available OFDM symbols of the first slots of the PRB pairs used for bearing the R-PDCCH after completely or partially interleaving the DL grant, wherein all available OFDM symbols in the PRB pairs above, other than the OFDM symbols used for the DL grant, are used for bearing the R-PDSCH of the RN. Similar to Mode 1 in Embodiment 4, during complete interleaving, this mode is as shown in FIG. 8; during partial interleaving, this mode is as shown in FIG. 9.

Mode 2

The eNB 10 respectively maps the DL grant of different RNs onto all available OFDM symbols of the first slots of the PRB pairs used for bearing the R-PDCCH without performing interleaving between the DL grant of different RNs, wherein all available OFDM symbols of the second slots of the PRB pairs above are used for bearing the R-PDSCH of an RN the same as or different from the RN of the first slot. Similar to Mode 2 in Embodiment 4, it is as shown in FIG. 10.

Embodiment 8

In this embodiment, the RN 20 demodulates the R-PDCCH based on a CRS. The RN under the eNB 10 has UL grant alone, with no DL grant. Similar to Embodiment 3, the eNB 10 semi-statically reserves a group of one or more PRB pairs (eight PRB pairs) used for bearing the R-PDCCH.

In this embodiment, the eNB 10 can bear the R-PDCCH of an RN on the PRB pairs allocated for the RN to transmit to the RN according to the following modes.

Mode 1

The eNB 10 maps the UL grant of all RNs 20 onto part or all available OFDM symbols of the first slots of the PRB pairs used for bearing the R-PDCCH after completely or partially interleaving the UL grant, wherein all the rest available OFDM symbols in the PRB pairs above, other than the OFDM symbols used for the UL grant, are used for bearing downlink services of other RNs. In this mode, the DL grant in FIG. 8 is changed to be the UL grant and the UL grant occupies the whole first slot; during partial interleaving, the DL grant in FIG. 9 is changed to be the UL grant and the UL grant occupies the whole first slot.

Mode 2

The eNB 10 respectively maps the UL grant of different RNs onto all available OFDM symbols of the first slots of the PRB pairs used for bearing the R-PDCCH without performing interleaving between the UL grant of different RNs, wherein all available OFDM symbols of the second slots of the PRB pairs above are used for bearing downlink services of other RNs. In this mode, the DL grant in FIG. 10 is changed to be the UL grant and the UL grant occupies the whole first slot, and the R-PDSCH is the downlink services of other RNs.

Mode 3

The eNB 10 maps the UL grant of all RNs 20 onto all available OFDM symbols of the PRB pairs used for bearing the R-PDCCH after completely or partially interleaving the UL grant of all RNs 20. During complete interleaving, this mode is as shown in FIG. 12; during partial interleaving, this mode is as shown in FIG. 13.

Mode 4

The eNB 10 respectively maps the UL grant of different RNs onto all available OFDM symbols of different PRB pairs used for bearing the R-PDCCH without performing interleaving between the UL grant of different RNs, that is, each RN has its own dedicated PRB pairs, as shown in FIG. 14.

Embodiment 9

In this embodiment, the RN 20 demodulates the R-PDCCH based on a CRS. Some RNs under the eNB 10 have DL grant alone, while other RNs 20 have UL grant alone. Similar to Embodiment 3, in this embodiment, the eNB 10 semi-statically reserves a group of one or more PRB pairs (eight PRB pairs) used for bearing the R-PDCCH.

In this embodiment, the eNB 10 can bear the R-PDCCH of the RN on a PRB pair allocated for the RN to transmit to the RN according to the following modes.

Mode 1

Similar to Mode 1 in Embodiment 5, the eNB 10 maps all DL grant and UL grant onto all available OFDM symbols of the first slots of the PRB pairs used for bearing the R-PDCCH after partially or completely interleaving all DL grant and UL grant, wherein all available OFDM symbols of the second slots of the PRB pairs above are used for bearing downlink services of the RN. During complete interleaving, this mode is as shown in FIG. 15; during partial interleaving, this mode is as shown in FIG. 16.

Mode 2

The eNB 10 maps all DL grant onto all available OFDM symbols of the first slots of the PRB pairs used for bearing the R-PDCCH after completely or partially interleaving all the DL grant, and maps all UL grant onto all available OFDM symbols of the second slots of the PRB pairs above after completely or partially interleaving all the UL grant. During complete interleaving, this mode is as shown in FIG. 17.

Mode 3

Interleaving is not performed between the DL grant and the UL grant and the DL grant and the UL grant are respectively mapped to different PRB pairs, wherein the DL grant is mapped onto part or all available OFDM symbols of the first slots of the PRB pairs used for bearing the R-PDCCH, and the rest available OFDM symbols are used for bearing the R-PDSCH corresponding to the DL grant; the UL grant is mapped onto all available OFDM symbols of the first slots of the PRB pairs or all available OFDM symbols of the PRB pairs.

Mode 4

Interleaving is not performed between the DL grant and the UL grant and the DL grant and the UL grant are mapped to the same PRB pairs, wherein the DL grant is mapped onto all available OFDM symbols of the first slots of the PRB pairs used for bearing the R-PDCCH; the UL grant is mapped onto all available OFDM symbols of the second slots of the PRB pairs above.

Embodiment 10

In this embodiment, a certain downlink backhaul subframe is demodulated based on a precoded DMRS, wherein the above four combinations are all included. An RN1 and an RN2 have both DL grant and UL grant; an RN3 and an RN4 have DL grant alone; and an RN5 and an RN6 have UL grant alone.

The mapping principle of the eNB end is as follows.

Since demodulation is performed based on a precoded DMRS, the eNB semi-statically allocates a dedicated PRB pair used for bearing the R-PDCCH for each RN, that is, different R-PDCCH are not interleaved with each other; the same DL/UL grant can be internally interleaved. The DL grant can only be mapped onto all available OFDM symbols of the first slots of the PRB pairs. If both DL grant and UL grant exist, the UL grant is mapped onto available OFDM symbols of the second slots of the PRB pairs; otherwise, the UL grant is preferentially mapped to the first slots of the PRB pairs and secondly is mapped to the entire subframe of the PRB pairs.

Figure 21:
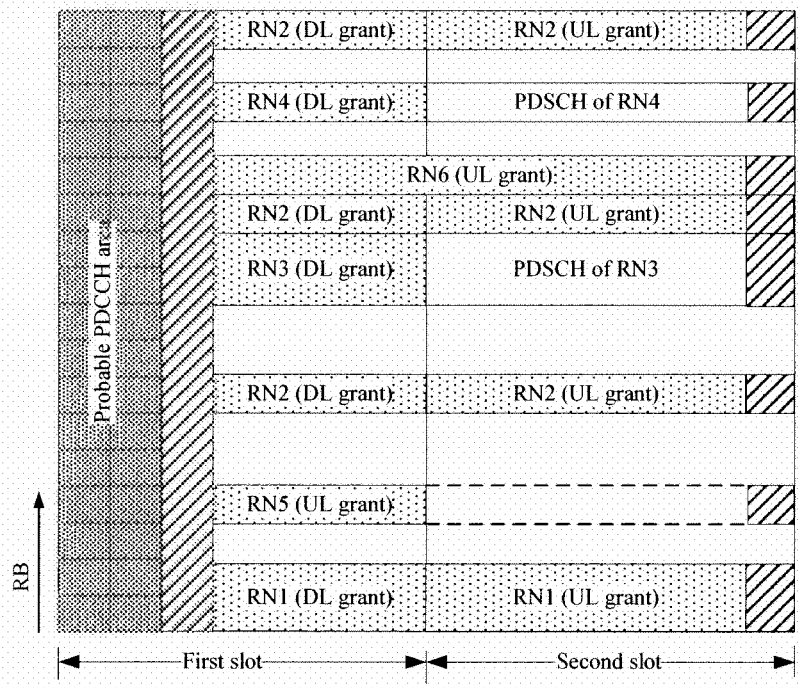
FIG. 21 shows a mapping diagram of an R-PDCCH according to Embodiment 10 of the present invention.

As shown in FIG. 21, the DL grant of an RN1 and the DL grant of an RN2 are mapped onto available OFDM symbols of the first slots of their respective PRB pairs, and the UL grant of the RN1 and the UL grant of the RN2 are mapped onto available OFDM symbols of the second slots of their respective PRB pairs. The DL grant of an RN3 and the DL grant of an RN4 are mapped onto available OFDM symbols of the first slots of their respective PRB pairs, and available OFDM symbols of the second slots bear their respective R-PDSCH. The UL grant of an RN5 is mapped onto available OFDM symbols of the first slot of its PRB pair, and the second slot bears other downlink services. The UL grant of an RN6 is mapped onto available OFDM symbols of the entire subframe of its own PRB pair.

Embodiment 11

In this embodiment, a certain downlink backhaul subframe is demodulated based on a precoded CRS, wherein the above four combinations are all included. An RN1 and an RN2 have both DL grant and UL grant; an RN3 and an RN4 have DL grant alone; and an RN5 and an RN6 have UL grant alone.

Figure 20:
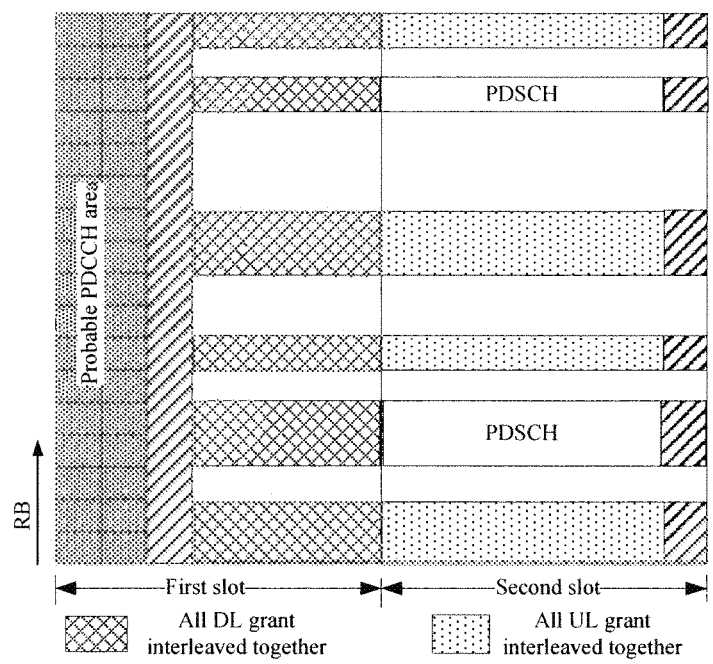
FIG. 20 shows a mapping diagram of an R-PDCCH according to Embodiment 9 of the present invention.

The mapping of the eNB end comprises the following:

1. not distinguishing the DL grant and the UL grant, completely interleaving or partially interleaving the R-PDCCH of all RNs together and then mapping onto available OFDM symbols of the first slots of PRB pairs, as shown in FIG. 19;

2. completely or partially interleaving all DL grant together and then mapping onto available OFDM symbols of the first slots of the PRB pairs, completely interleaving or partially interleaving all UL grant together and then mapping onto available OFDM symbols of the second slots of the PRB pairs above, as shown in FIG. 20.

From the description above it can be seen that in the embodiments of the present invention, by bearing downlink grant information and/or uplink grant information of an R-PDCCH onto available OFDM symbols of a pre-allocated PRB pair used for bearing the R-PDCCH, the present invention is well applicable to a link between an eNB and a relay node, not only guarantees backward compatibility (compatible with an LTE system), but also solves the mapping problem of the R-PDCCH, and meanwhile enables backhaul resources to be used adequately.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. A transmission method for a Relay Physical Downlink Control Channel (R-PDCCH), comprising the steps of:
    an enhanced Node B (eNB) bearing downlink grant information of a relay node (RN) onto an available Orthogonal Frequency Division Multiplex (OFDM) symbol of a first slot of a pre-allocated Physical Resource Block (PRB) pair used for bearing the R-PDCCH, and bearing uplink grant information of the relay node onto an available OFDM symbol of the first slot or the first slot and second slot of the PRB pair, wherein available OFDM symbols in the PRB pair, other than the OFDM symbol used for the downlink grant information and the uplink grant information, are used for bearing a Physical Downlink Shared Channel (PDSCH) of each relay node; and
    the eNB transmitting the PRB pair bearing the downlink grant information and the uplink grant information and the R-PDSCH to the relay node;
    wherein after the step of the eNB transmitting the PRB pair to the relay node, the method further comprises a step of: the relay node demodulating the R-PDCCH using a Cell-Specific Reference Signal (CRS) to obtain the downlink grant information and the PDSCH of the relay node;
    wherein for each relay node, which only has the downlink grant information, under the eNB, the eNB bears the downlink grant information and the PDSCH of each relay node onto the PRB pair according to one of the following modes:
    after the eNB completely or partially interleaves the downlink grant information of each relay node, the eNB bearing the completely or partially interleaved downlink grant information onto the available OFDM symbol of the first slot of the PRB pair, wherein all the available OFDM symbols in the PRB pair, other than the OFDM symbol used for the downlink grant information, are used for bearing the PDSCH of each relay node;
    the eNB bearing the downlink grant information of each relay node onto the available OFDM symbol of the first slot of the PRB pair, wherein a second slot of the PRB pair is used for bearing the PDSCH of each relay node;
    wherein the complete interleaving refers that an eNB concentrates downlink grants or uplink grants of all RNs in series and performs interleaving with Resource Element Group (REG) as a unit or Control Channel Element (CCE) as a unit;
    the partial interleaving refers that an eNB groups RNs, only concentrates downlink grants or uplink grants of the RNs in the same group in series and performs interleaving with REG as a unit or CCE as a unit.

2. The method according to claim 1, wherein after the step of the eNB transmitting the PRB pair to the relay node, the method further comprises a step of: the relay node demodulating the R-PDCCH using a Demodulation Reference Signal (DMRS) to obtain the downlink grant information and the PDSCH of the relay node.

3. The method according to claim 2, wherein for each relay node, which only has the downlink grant information, under the eNB, the eNB bears the downlink grant information and the PDSCH of each relay node onto the PRB pair according to one of the following modes:
    applying a non-precoded DMRS to the first slot of the PRB pair, after the eNB completely or partially interleaves the downlink grant information of each relay node, the eNB bearing the completely or partially interleaved downlink grant information onto the available OFDM symbol of the first slot of the PRB pair, wherein the available OFDM symbols in the PRB pair, other than the OFDM symbol used for the downlink grant information, are used for bearing the PDSCH of each relay node;
    applying a non-precoded DMRS to the first slot of the PRB pair, the eNB bearing the downlink grant information of respective relay nodes onto available OFDM symbols of the first slots of different PRB pairs respectively, wherein the available OFDM symbols in the PRB pair, other than the OFDM symbol used for the downlink grant information, are used for bearing the PDSCH of each relay node;
    applying a precoded DMRS, the eNB bearing the downlink grant information of respective relay nodes onto available OFDM symbols of the first slots of different ERB pairs respectively, wherein the available OFDM symbols in the PRB pair, other than the OFDM symbol used for the downlink grant information, are used for bearing the PDSCH of the relay node corresponding to the first slot of the PRB pair.

4. A transmission system for a Relay Physical Downlink Control Channel (R-PDCCH), comprising:

an enhanced Node B (eNB), configured to bear downlink grant information of a relay node (RN) onto an available OFDM symbol of a first slot of a pre-allocated Physical Resource Block (PRB) pair used for bearing the R-PDCCH, and bear uplink grant information of the relay node onto an available OFDM symbol of the first slot or the first slot and a second slot of the PRB pair, wherein available OFDM symbols in the PRB pair, other than the OFDM symbol used for the downlink grant information and the uplink grant information, are used for bearing a Physical Downlink Shared Channel (PDSCH) of each relay node;

the relay node, configured to demodulate out the downlink grant information and the uplink grant information and the PDSCH of the relay node from the PRB pair;

wherein the relay node is configured to demodulate the R-PDCCH using a Cell-Specific Reference Signal (CRS) to demodulate out the downlink grant information and the PDSCH of the relay node from the PRB pair;

wherein for each relay node, which only has the downlink grant information, under the eNB, the eNB bears the downlink grant information and the PDSCH of each relay node onto the PRB pair according to one of the following modes:

after the eNB completely or partially interleaves the downlink grant information of each relay node, the eNB bearing the completely or partially interleaved downlink grant information onto the available OFDM symbol of the first slot of the PRB pair, wherein all the available OFDM symbols in the PRB pair, other than the OFDM symbol used for the downlink grant information, are used for bearing the PDSCH of each relay node;

the eNB bearing the downlink grant information of each relay node onto the available OFDM symbol of the first slot of the PRB pair, wherein a second slot of the PRB pair is used for bearing the PDSCH of each relay node;

wherein the complete interleaving refers that an eNB concentrates downlink grants or uplink grants of all RNs in series and performs interleaving with REG as a unit or CCE as a unit; the partial interleaving refers that an eNB groups RNs, only concentrates downlink grants or uplink grants of the RNs in the same group in series and performs interleaving with Resource Element Group (REG) as a unit or Control Channel Element (CCE) as a unit.

5. The system according to claim 4, wherein the relay node is configured to demodulate the R-PDCCH using a Demodulation Reference Signal (DMRS) to demodulate out the downlink grant information and the PDSCH of the relay node from the PRB pair.

* * * * *